Oct. 27, 1931.  O. R. SELL  1,829,191
COMBINATION SWITCH AND HEAD LAMP CONTROL
Filed April 29, 1930  5 Sheets-Sheet 1
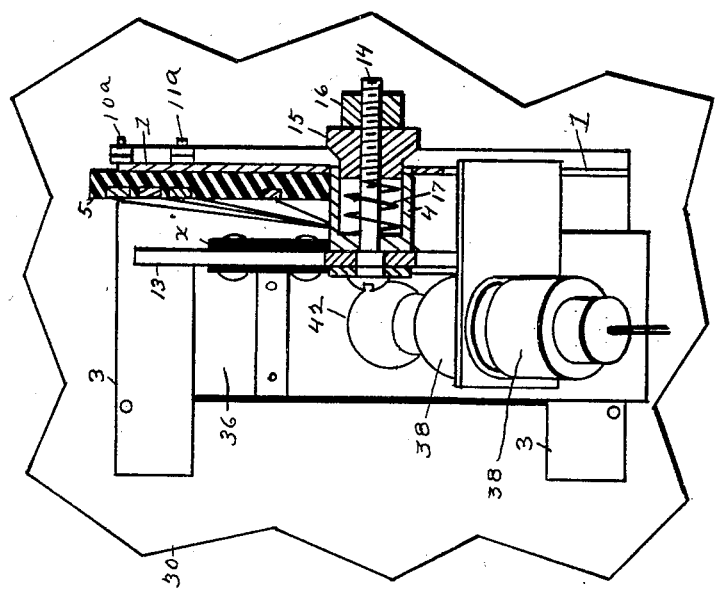
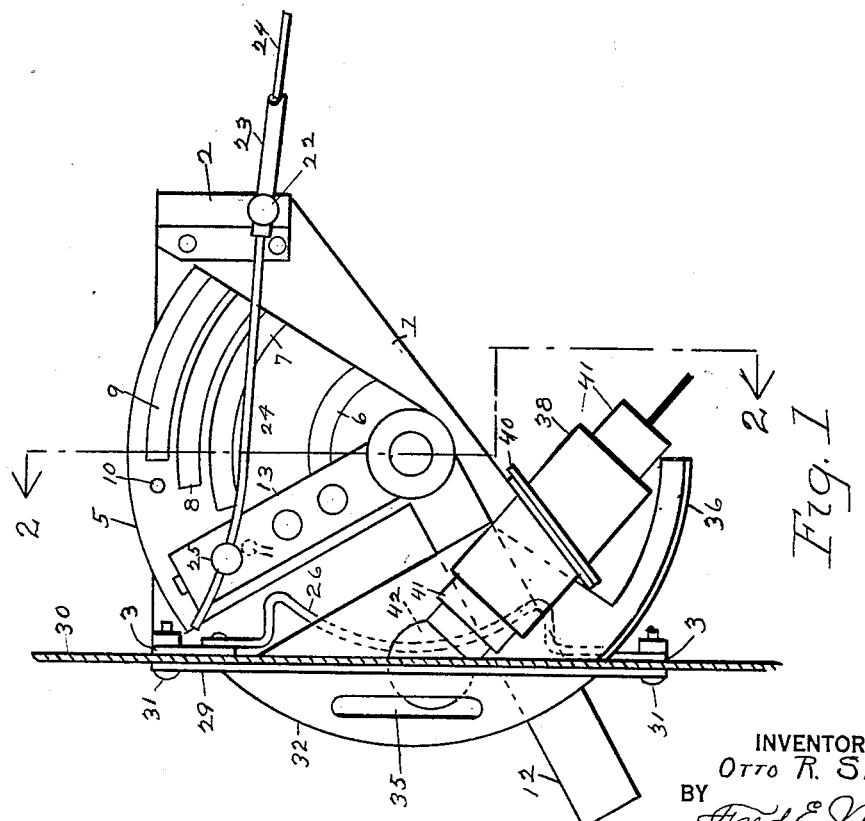
INVENTOR
OTTO R. SELL
BY
Fred E. Mefford
ATTORNEY

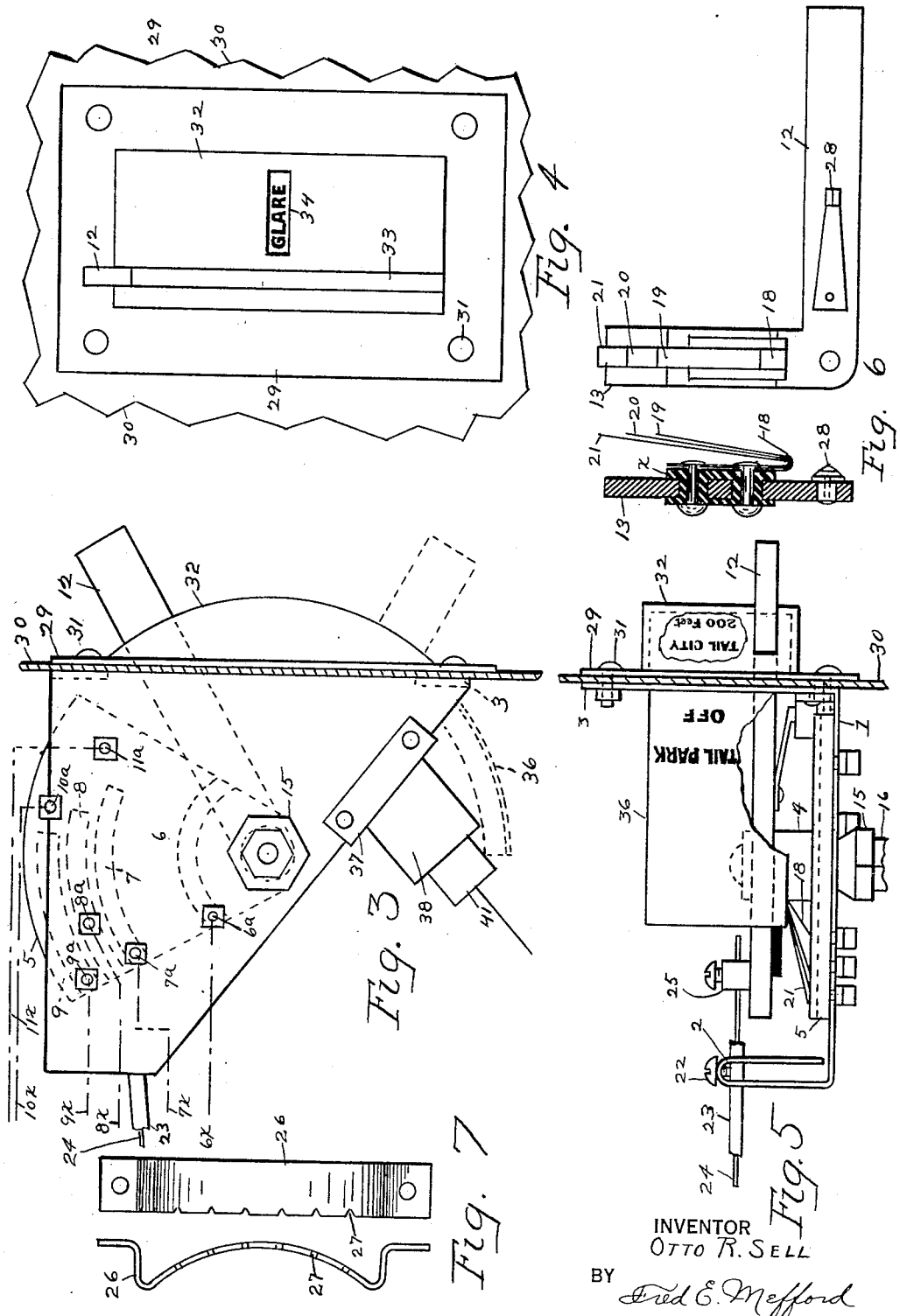

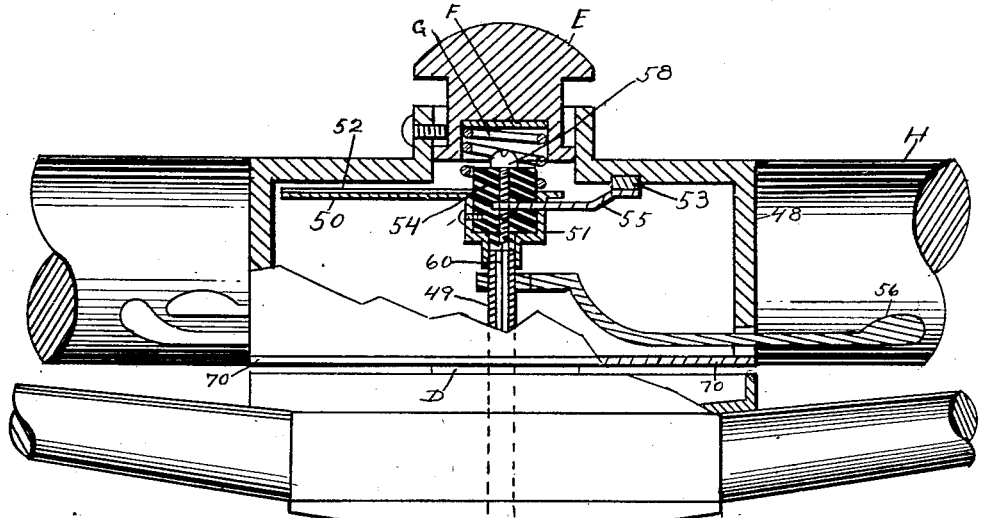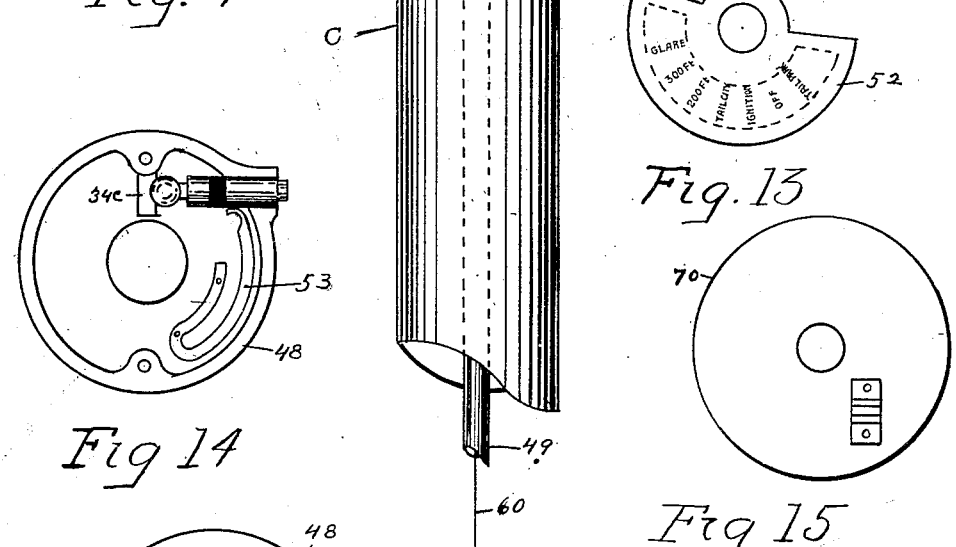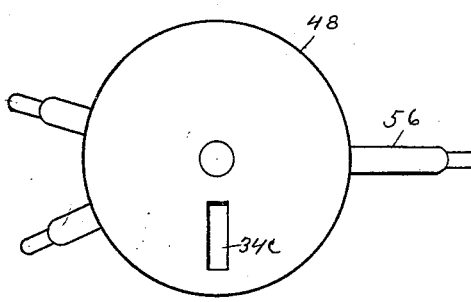

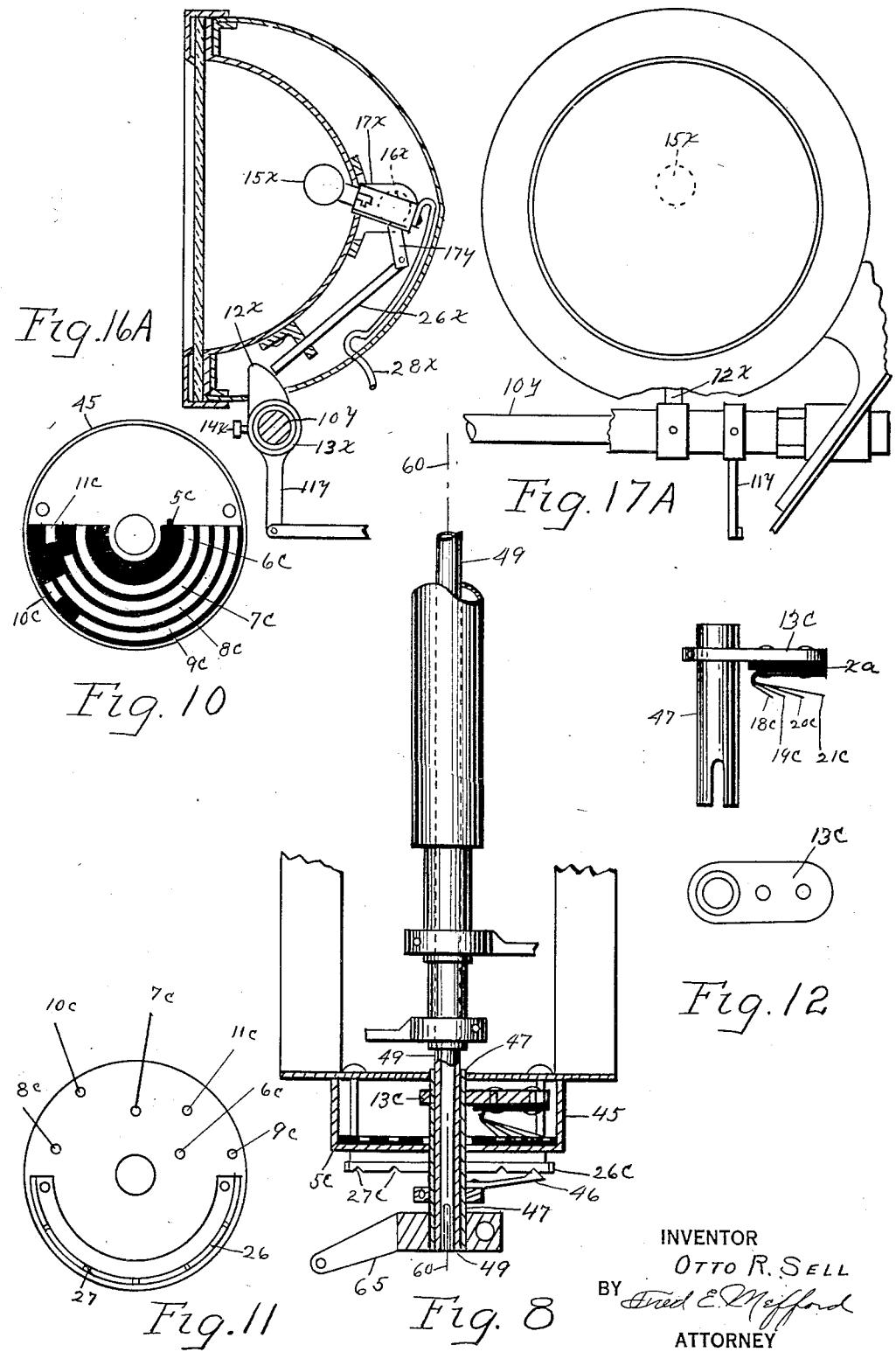

Oct. 27, 1931. O. R. SELL 1,829,191
COMBINATION SWITCH AND HEAD LAMP CONTROL
Filed April 29, 1930  5 Sheets-Sheet 5
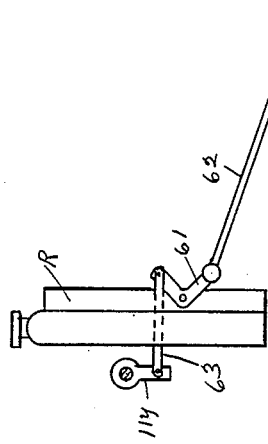
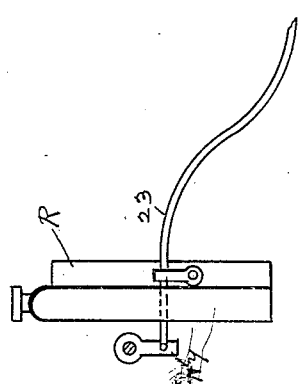
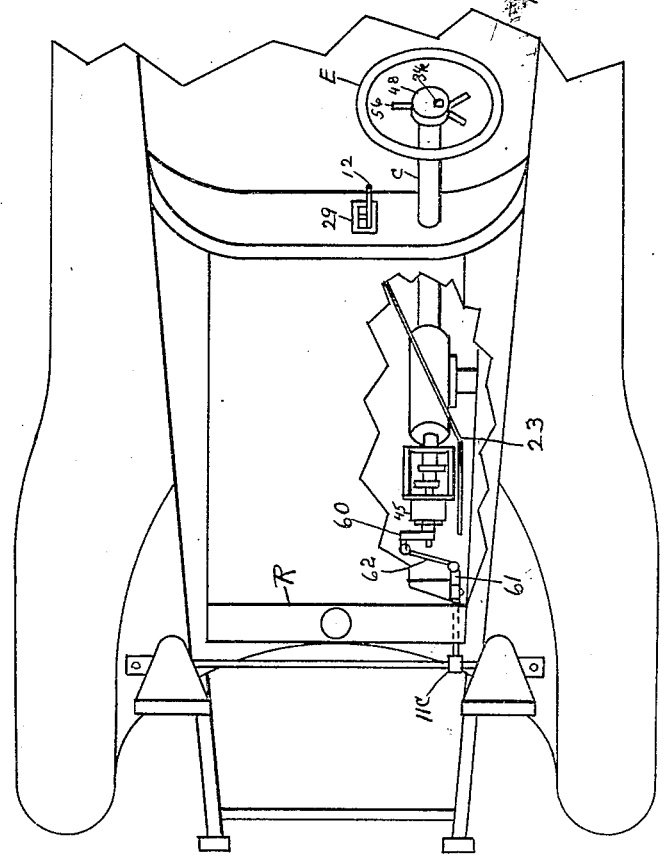
INVENTOR
*Otto R. Sell*
BY *Fred E. Mefford*
ATTORNEY Patented Oct. 27, 1931

1,829,191

UNITED STATES PATENT OFFICE

OTTO R. SELL, OF COLORADO SPRINGS, COLORADO

COMBINATION SWITCH AND HEAD LAMP CONTROL

Application filed April 29, 1930. Serial No. 448,348.

This invention relates to devices for controlling circuits and manipulations of automobile head lamps, such as described in my Patent No. 1,647,890 and my co-pending application Serial No. 285,430. Other objects will appear as the description progresses.

Figure 1 represents a side elevation of the dash panel style mounted on a fragment of an automobile dash panel; Fig. 2, a sectional elevation on the line 2—2 in Fig. 1; Fig. 3, a side elevation, of the reverse side of Fig. 1; Fig. 4, an elevation of Fig. 3; Fig. 5, a plan view of Fig. 3; Fig. 6, a sectional elevation, and side view of the operating lever; Fig. 7, an edge and a side view of the notched curved plate; Fig. 8, a cross sectional elevation of a fragment of the lower part of a steering wheel column assembly showing part of my steering wheel column style device connected thereto; Fig. 9, an enlarged fragmentary elevation, partly in section of the upper portion of a steering wheel column assembly; showing a part of my device connected therewith; Fig. 10, a sectional plan view on the line 10—10 in Fig. 8; Fig. 11, a reverse view of Fig. 10; Fig. 12, enlarged fragmentary sectional elevation and plan of the tube and brush carrying arm; Fig. 13, a reduced plan view of the index plate; Fig. 14, an underside interior view of the housing 47; Fig. 15, a plan view of the flange 70 of the stationary tube C; Figs. 16A and 17A correspond to Figs. 2 and 3 in my patent above identified; Fig. 16, a plan view of the housing 48; Fig. 17, a fragmentary plan of an automobile showing both styles of my device attached thereto; Fig. 18, a side view of a radiator showing a Boden control connection; and Fig. 19, a side view of a radiator showing a bell crank—ball and socket connection.

Although I show the preferred embodiment of my invention, I do not thereby limit myself to the precise forms shown, but wish it understood that within the scope of what hereinafter is claimed, various changes in the details of construction may be made without departing from the spirit of the invention.

A base plate 1 is provided with a lug 2, base brackets and a round aperture. A blind thimble 4 is mounted in said aperture and contains a square hole in its blind end. An insulation sheet 5 is secured to said base plate 1 and carries a series of concentrically curved contact plates 6, 7, 8, 9 provided with terminal posts 6a, 7a, 8a, 9a extending through insulation sheet 5 and base plate 1. A contact point 10, provided with a terminal post 10a is mounted in insulation sheet 5 and base plate 1, and is located in an arc concentric with curved plate 9. A contact point 11 is mounted in insulation sheet 5 and a contact point 11 is located in an arc concentric with terminal plate 8. The base plate 1 contains a hole in which a thimble 4 is mounted. An operating lever, having a long arm 12 and a short arm 13, is pivoted concentrically on thimble 4.

The pivoting means comprise a bolt 14 extending through an operating lever and thimble 4, and held in place by nut 15 which is locked by jam nut 16. A spring 17 is disposed about bolt 14 within thimble 4 and presses against nut 15 to hold the operating lever snugly against the thimble 4. The bolt 14 is provided with a round portion to provide a pivot for said operating lever, and a square portion to fit into a square hole of the thimble 4 to prevent said bolt from turning.

A series of flat spring brushes 18—19—20—21 are mounted on short arm 13 of the operating lever against insulation and positioned so that said brushes swing in the proper arcs to contact with terminal plates 6—7—8—9, respectively. A Bowden control 23 extends through lug 2 and is held in place by screw 22. A swivel post 25 is pivoted on short arm 13 of the operating lever, and carries one end of wire 24.

A curved plate 26, provided with notches 27, is secured to brackets 3 so that the curve is concentric with the pivotal point of the operating lever. A ratchet spring 28 is secured to the long arm 12 of the operating lever and slides along the edge of curved plate 26, and engages the notches 27.

A panel plate 29 is disposed on one side of the panel 30 of an automobile, while the brackets 3 of the base plate 1 are disposed against the opposite side of said panel and the three bolted together by bolts 31. The panel plate 29 contains a convex portion 32 curved concentrically with the pivotal point of the operating lever and provided with a slot 33 in which the long arm 12 of the operating lever extends. The curved portion 32 contains a window 34 and a side window 35. An index dial 36, of celluloid or other translucent material is curved concentrically with the pivotal point of said operating lever, and mounted on the long arm 12 adjacent to the convex part of said portion 32 so as to be read through the window 34.

A bracket 37 is secured to the lower edge of base plate 1 and carries an inclined tube 38 which contains a slot in which a U shaped spring clamp 40 is disposed. A lamp socket 41 is mounted in tube 38 and contains notches which are engaged by clamp spring 40. A lamp 42 is mounted in socket 41 so as to illuminate index dial 36 and to shine through side window 35, to light the instruments on the panel.

Figure 1, shows the arm 12 of the operating lever in the lowest position at which time the spring brushes 18—20 are in contact with contact plate 6 and contact point 11, respectively, and the words "tail-park" appear at the window 34, while the spring ratchet 28 engages the first notch 27 in curved plate 26. When spring ratchet 28 engages the second notch 27, the index words "off" appears at window 34 and brushes 18 contacts with plate 6 only. When spring ratchet 28 engages the third notch 27, the index word "ignition" appears at window 34, and brushes 18—19 contact with plates 6—7, respectively. When spring ratchet 28 engages the fourth notch 27, the index words "tail city" appear at window 34 and brushes 18—19—20 and 21 contact with plates 6—7—8 and contact point 10 respectively. When spring ratchet 28 engages the fifth notch 27, the index figures "200 ft." appear at window 34 and brushes 18—19—20 and 21 contact with plates 6—7—8 and 9 respectively, and continue to so contact throughout the remainder of the swing of arm 12. When ratchet 28 engages the sixth notch 27, the index figures "300 ft." appear at window 34 and when said ratchet engages the seventh notch 27, the index word "glare" appears at window 34.

When the device is in use, terminal post 6a is connected by wire 6x to the storage battery circuit of the automobile; terminal post 7a, connected by wire 7x to the ignition system and to a terminal of dial lamp 42; terminal post 8a connected by wire 8x to the tail light circuit; terminal post 9a connected by wire 9x to a terminal of the central filament in a two filament bulb; terminal post 10a connected by wire 10x to the terminal of the eccentrically located filament in a two filament bulb, and terminal post 11a connected by wire 11x to the tail and park lights circuit.

In my co-pending application above identified, I show a two filament bulb having a central filament and an eccentrically located filament.

In my Patent 1,647,890, I show in Figure 2, a view in vertical section through one of the lamp casings, and through the rock shaft and in Figure 3, a detail view showing the mounting of the end portions of the rock shaft. In Figs. 16A and 17A in the present drawings I have shown representatives of these views and describe a portion to show how the present devices cooperate with the headlight of the patent.

A horizontal shaft $10y$ is controlled by a fixed arm $11y$, and any suitable device connected therewith adapted to extend to a point within reach of the operator of the car. Shaft $10y$ has rigidly connected therewith, a cam designated $12x$, including a hub portion $13x$, retained on the shaft by set screw $14x$. Lamp bulb $15x$ is tiltably mounted, the base thereof, being received by tubular element $16x$ connected to conductor $28x$. The bracket $17x$ carries an arm $17y$ to which a bar $26x$ is pivoted, the tilting of the lamp holder being determined by the cooperation of cam $12x$ and bar $26x$.

In the present invention wire 24 is connected to the arm $11y$ and operates through the tube 23, as shown in Figure 18. Up to the point where the dial shows "city-tail" the cam $12x$ does not touch the bar $26x$, but after that point is reached the cam pushes the bar $26x$ and tilts the lamp, therefore, the appearance at the window 34, of the figures "200 ft." indicates that the lamp has reached the first tilted position; "300 ft." indicates the second position and "glare" indicates the horizontal position in line with the center of the reflector.

The steering wheel column style comprises a lower and upper assembly. The lower assembly includes a housing 45 secured to the lower end of the stationary tube bracket of the steering wheel column; an insulation sheet $5c$ disposed in the bottom of housing 45 and containing curved contact plates $6c$, $7c$, $8c$, $9c$; and contact points $10c$ and $11c$; an adjusting tube 47 rotatably mounted in the center of housing 45; an arm $13c$ mounted on tube 47; brushes $18c$, $19c$, $20c$, and $21c$ mounted on arm $13c$ against insulation $xa$; a notched curved plate $26c$ containing notches $27c$, secured to the underside of housing 45; and a spring ratchet 46 adapted to engage the notches $27c$ in the plate $26c$. The upper assembly comprises a housing 48 provided with a window $34c$ mounted on the flange 70 of the stationary tube of the steering wheel column assembly; a tube 49 extending downward from housing 48 into adjusting tube 47 and secured therein; a segmental plate 50, provided with a hollow hub 51 mounted on the upper end of tube 49 within housing 48; an index sheet 52 disposed on plate 50; a spring contact 53 secured to housing 48; insulation 54 disposed in hub 51; a brush 55 mounted in insulation 54 and the free end adapted to contact with spring contact 53; an operating lever 56 mounted on tube 49. A screw 58 is screwed into insulation 54 and contacts with brush 55 and with a wire 60 which leads to the horn circuit. In Figure 9, the reference characters C, D, E, F, G, H, denote, respectively, the column, the stationary tube, the horn button, the horn button contact, the horn button spring, and the wheel.

In operation, the lever 56 corresponds to long arm 12 of the dash panel style, and the arm 13c corresponds to the short arm 13. The brushes 18c, 19c, 20c and 21c cooperate with plates 6c, 7c, 8c and 9c and contact points 10c and 11c in the same relation that brushes 18, 19, 20 and 21 cooperate with plates 6, 7, 8, 9 and contact points 10 and 11. The index sheet 52 cooperates with window 34c in the same manner as dial 36 cooperates with window 34.

In practice, an arm 60 is mounted on the lower end of tube 47 and a bell crank 61, on the radiator R of an automobile. A ball and socket connecting rod 62 is attached to the free end of arm 65 and connected to one arm of the bell crank 61. A rod 63 extends through radiator R one end of which is connected to bell crank 61 and the other end attached to arm 11y.

In Fig. 6, I show a Boden control 23, partly broken away, one end of which is connected to the operating lever arm 13 of the dash panel style and the other end adapted to be connected to arm 11y as shown in Fig. 18.

I claim—

1. In combination with an automobile panel having a rectangular aperture, a base plate; an operating lever, provided with a long and short arm, pivoted on said base plate; brackets on said base plate secured to said panel adjacent to said rectangular aperture; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window.

2. In combination with an automobile panel having a rectangular aperture, a base plate; an operating lever, provided with a long and short arm, pivoted on said base plate; brackets on said base plate secured to said panel adjacent to said rectangular aperture; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window; a Boden control mounted on said base plate, the wire of said control being connected to the short arm of said operating lever and the free end being adapted to be connected to a tilting lever of a head lamp tilting device.

3. In combination with an automobile panel having a rectangular aperture, a base plate; an operating lever, provided with a long and short arm, pivoted on said base plate; brackets on said base plate secured to said panel adjacent to said rectangular aperture; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window; a notched plate mounted on said base plate; a spring ratchet mounted on the long arm of said operating lever and adapted to engage the notches in said notched plate; a lamp mounted on said base plate and disposed so as to light said index sheet; a Boden control mounted on said base plate, the wire of said control being connected to the short arm of said operating lever and the free end being adapted to be connected to a tilting lever of a head lamp tilting device.

4. In combination with an automobile panel having a rectangular aperture, a base plate; an operating lever, provided with a long and a short arm, pivoted on said base plate; brackets on said base plate secured to said panel adjacent to said rectangular aperture; an insulation sheet secured to said base plate; a series of curved contact plates, curved concentrically with the pivotal point of said operating lever and mounted in said insulation sheet, each contact plate being provided with a terminal binding post; a contact point, provided with a terminal binding post, spaced from one end of the plate 9 and mounted in said insulation sheet; a contact point, provided with a terminal binding post, spaced from one end of contact plate 8 and mounted in said insulation sheet; insulation secured to the short arm of said operating lever; a series of spring brushes mounted on said short arm against said insulation, each brush terminating so as to contact with a different contact plate; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window.

5. In combination with an automobile panel having a rectangular aperture, a base plate; an operating lever, provided with a long and a short arm, pivoted on said base plate; brackets on said base plate secured to said panel adjacent to said rectangular aperture; an insulation sheet secured to said base plate; a series of curved contact plates, curved concentrically with the pivotal point of said operating lever and mounted in said insulation sheet, each contact plate being provided with a terminal binding post; a contact point, provided with a terminal binding post, spaced from one end of the plate 9 and mounted in said insulation sheet; a contact point, provided with a terminal binding post, spaced from one end of contact plate 8 and mounted in said insulation sheet; insulation secured to the short arm of said operating lever; a series of spring brushes mounted on said short arm against said insulation, each brush terminating so as to contact with a different contact plate; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window; a Bowden control mounted on said base plate, the wire of said control being connected to the short arm of said operating lever and the free end being adapted to be connected to a tilting lever of a head lamp tilting device.

6. In combination with an automobile panel having a rectangular aperture, a base plate; and operating lever, provided with a long and a short arm, pivoted on said base plate; brackets on said base plate secured to said panel adjacent to said rectangular aperture; an insulation sheet secured to said base plate; a series of curved contact plates, curved concentrically with the pivotal point of said operating lever and mounted in said insulation sheet, each contact plate being provided with a terminal binding post; a contact point, provided with a terminal binding post, spaced from one end of the plate 9 and mounted in said insulation sheet; a contact point, provided with a terminal binding post, spaced from one end of contact plate 8 and mounted in said insulation sheet; insulation secured to the short arm of said operating lever; a series of spring brushes mounted on said short arm against said insulation, each brush terminating so as to contact with a different contact plate; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window; a notched plate mounted on said base plate; a spring ratchet mounted on the long arm of said operating lever and adapted to engage the notches in said notched plate.

7. In combination with an automobile panel having a rectangular aperture, a base plate; and operating lever, provided with a long and a short arm, pivoted on said base plate; brackets on said base plate secured to said panel adjacent to said rectangular aperture; an insulation sheet secured to said base plate; a series of curved contact plates, curved concentrically with the pivotal point of said operating lever and mounted in said insulation sheet, each contact plate being provided with a terminal binding post; a contact point, provided with a terminal binding post, spaced from one end of the plate 9 and mounted in said insulation sheet; a contact point, provided with a terminal binding post, spaced from one end of contact plate 8 and mounted in said insulation sheet; insulation secured to the short arm of said operating lever; a series of spring brushes mounted on said short arm against said insulation, each brush terminating so as to contact with a different contact plate; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window; a notched plate mounted on said base plate; a spring ratchet mounted on the long arm of said operating lever and adapted to engage the notches in said notched plate; a Boden control mounted on said base plate, the wire of said control being connected to the short arm of said operating lever and the free end being adapted to be connected to a tilting lever of a head lamp tilting device.

8. In combination with an automobile panel having a rectangular aperture, a base plate; an operating lever, provided with a long and a short arm, pivoted on said base plate; brackets on said base plate secured to said panel adjacent to said rectangular aperture; an insulation sheet secured to said base plate; a series of curved contact plates, curved concentrically with the pivotal point of said operating lever and mounted in said insulation sheet, each contact plate being provided with a terminal binding post; a contact point, provided with a terminal binding post, spaced from one end of the plate 9 and mounted in said insulation sheet; a contact point, provided with a terminal binding post, spaced from one end of contact plate 8 and mounted in said insulation sheet; insulation secured to the short arm of said operating lever; a series of spring brushes mounted on said short arm against said insulation, each brush terminating so as to contact with a different contact plate; a panel plate, provided with an extruded portion curved concentrically with the pivotal point of said operating lever, and secured to said automobile panel, adjacent to said rectangular aperture, said extruded portion being provided with a peripheral slot through which said long arm of said operating lever operates, and a peripheral window; an index sheet, curved concentrically with the pivotal point of said operating lever and mounted on said lever so as to travel in the extruded portion of said panel plate and to be read through said peripheral window; a notched plate mounted on said base plate; a spring ratchet mounted on the long arm of said operating lever and adapted to engage the notches in said notched plate; a lamp mounted on said base plate and disposed so as to light said index sheet; a Boden control mounted on said base plate, the wire of said control being connected to the short arm of said operating lever and the free end being adapted to be connected to a tilting lever of a head lamp tilting device.

9. In combination with a steering wheel column assembly, a housing secured to the lower end of the stationary tube bracket of the steering wheel column; an insulation sheet disposed in the bottom of said housing and containing curved contact plates concentrically disposed and contact points; a tube rotatably mounted in said housing and carrying an arm; brushes mounted on said arm, each brush terminating so as to contact with a different contact plate; a notched curved plate secured to the underside of said housing; a spring ratchet mounted on said rotatably mounted tube and adapted to engage the notches in said notched plate; a housing containing a window, mounted on the flange of the stationary tube of the steering wheel assembly; a tube extending downward from said second named housing into said rotatably mounted tube in said first named housing and clamped therein; a plate carrying an index sheet, located adjacent to said window and mounted on said downwardly extended tube; a lamp mounted in said second named housing so as to illuminate said index sheet; a contact plate mounted in the upper portion of said second named housing; a brush mounted in the hub of said plate and adapted to contact with said last named contact plate; an operating lever mounted on said downwardly extended tube; an arm mounted on the lower end of said downwardly extended tube; a ball and socket connecting rod connected to said arm and adapted to be connected to a bell crank mounted on the automobile radiator, said bell crank being attached to the tilting lever of a head lamp tilting device.

OTTO R. SELL.